April 19, 1938.  D. ROBERTS ET AL  2,114,686
CONTAINER
Filed Jan. 15, 1934
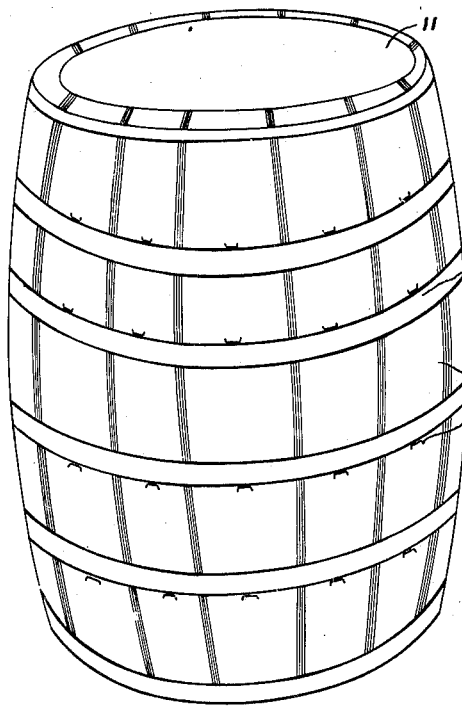
Fig. 1
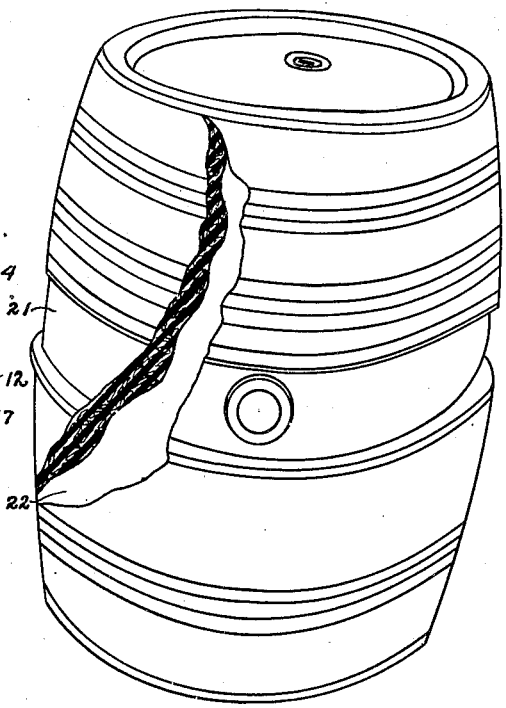
Fig. 2
Fig. 4
Fig. 3
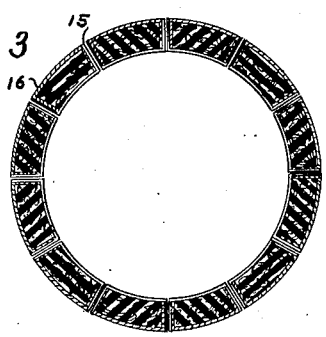
Fig. 5
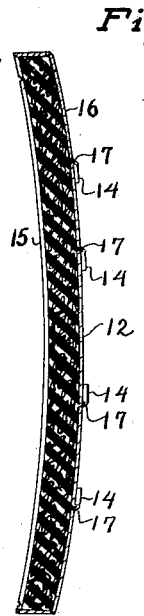
INVENTOR.
Dudley Roberts
Frederick William PEEL
BY
Samuel Ostrolenk
ATTORNEY.

Patented Apr. 19, 1938

2,114,686

UNITED STATES PATENT OFFICE 2,114,686

CONTAINER

Dudley Roberts, New York, and Frederick William Peel, Yonkers, N. Y., assignors to Rubatex Products, Inc., Wilmington, Del., a corporation of Delaware Application January 15, 1934, Serial No. 706,770

6 Claims. (Cl. 220—63)

Our invention relates to barrels, and more particularly relates to barrels for beverages such as beer.

Heretofore it has been the practice to construct beer barrels out of staves and hoops made of wood. These barrels require the use of thick hard wood to produce the necessary strength. This thickness of wood necessitates considerable soaking to swell sufficiently for providing the required leak-proof seal.

Such barrels are constantly in need of repair. Thus, to maintain such barrels in use, it is necessary, after every period of disuse, to re-soak the barrel until the staves re-swell sufficiently to again seal the barrel. Moreover, the empty barrel weighs approximately one hundred pounds, a matter of no small moment in shipping.

Attempts have been made to overcome this by making beer barrels out of sheet steel. However, it has been found that there are a number of disadvantages in this type of barrel, such as leakage due to poor seals.

We have discovered that we can make a cheap, durable and strong beer barrel of an insulation compound encased in a metal container, to provide strength. The metal is in turn encased in a thin veneer wood to provide an effective seal. This is not only much cheaper than wood or steel alone, but, because of its insulating qualities, it is able to maintain the beer for a very long time at substantially the temperature at which it is poured into the barrel.

Moreover, we have discovered that we can, as will be described hereinafter, so blow up a sheet of rubber between the inner and outer metal barrel that every bit of space is filled. This results in a more perfect insulation and furnishes a cushion between the two layers of metal which overcomes many of the disadvantages in the present metal barrels.

Accordingly, an object of our invention is to provide novel beer barrels.

A further object of our invention is to provide beer barrels having insulated walls.

Still a further object of our invention is to provide beer barrels made of expanded rubber.

Another object of our invention is to provide beer barrels having steel encased insulation walls which, in turn, are encased in wood.

There are other objects of our invention which together with the foregoing will appear in the detailed description which is to follow in connection with the drawing in which:

Figure 1 is a perspective view of one form of our beer barrel;

Figure 2 is a perspective view, with the walls partly removed, of a modified form of beer barrel;

Figure 3 is a cross section of the beer barrel shown in Figure 1; and

Figure 4 is a cross section of one of the staves of the beer barrel.

Figure 5 is a vertical cross section of one of the staves of the beer barrel.

In Figure 1 we have shown a beer barrel 11, made of staves 12 secured together in place by the hoops 14.

Each stave is comprised of the channel-shaped metallic member 16, extending the length of the barrel and providing mechanical strength thereto. The member 16 is in turn encased in a second channel-shaped structure 15, made of fine veneer wood. In the space formed by the veneer wood and steel, there is embedded an insulation substance preferably expanded rubber, described in detail hereinafter.

The thin veneer of wood 15 covers substantially the entire inner surface of the barrel with which the beer contents come in contact to aid in suitable aging. The veneer layers are also adjacent to each other, covering substantially the entire surface along the engaging adjacent sides of the staves, so that upon swelling, these engaging sides are sealed to provide a tight seal against leakage.

Accordingly, the steel channel gives the barrel strength, the wood casing forms the seal, and the encased insulation aids in maintaining substantially constant temperature conditions of the liquid contents of the barrel over a considerable period of time.

The wood and steel channel-shaped members may be secured to each other and held in place in any suitable manner well-known in the art, by the provision of hoops 14 which may extend around the inner as well as the outer surfaces of the barrel. Prongs 17, protruding from the metal channel staves, engage the hoops and assist in securing them in place.

In a modified form of our invention disclosed in Figure 2, the barrel consists of two sheet metal barrels 21 and 22 held in spaced relation, as shown in the cut-away portion of Figure 2. The outer barrel 21 has corrugations formed therein to increase the strength of the barrel, in the manner well known in the art. In the space between the two wall sections, we have imbedded our preferred rubber composition, to be described in the following.

This rubber, the novel process of manufacture of which will be described below, and which contains an inert gas under high pressure, is made with the following constituents:

| | Per cent |
|---|---|
| Washed first grade crepe or smoked rubber | 40–75 |
| Sulphur | 6–30 |
| Light calcined magnesia | 3–5 |
| Ground gilsonite | 12 |
| Lower melting bituminous substances | 12 |

In the manufacture of this product, the crepe or smoked rubber is first masticated for a period of time depending on the poundage of rubber desired. To this is added an asphalt product such as bitumin, uniformly distributed over the rubber. In order to fully impregnate the bitumin in the rubber, the mixture is taken to a dark room for a period of twenty-four hours' rest, at the end of which time it is placed on a warm mill and heated to a temperature not to exceed 100° F. to plasticize the product.

With the product in a plastic state, the sulphur, calcined magnesia and gilsonite, in proportion as stated above, are then added and the resultant mixture held inactive for a second rest period of twenty-four hours to permit thorough impregnation. The resulting dough is then taken and manufactured into various articles such as slabs, boards, etc. by means of a warming up mill or forcing machine, and then cut into desired sizes.

These are then well chalked with French chalk and placed in a container for gassing. The rubber containers are placed in an air-tight warm gassing chamber or autoclave and the air pumped out from this chamber until a substantial vacuum is produced. All the oxygen in the rubber is thus withdrawn, preventing subsequent deterioration by the action of oxygen on the rubber. This step is exceedingly important for a successful production of inflated rubber, as heretofore the failure to remove the oxygen has resulted in an early deterioration of the rubber.

Carbon di--- ---ium, nitrogen, or any noncombusti--- ---nen injected at a pressure which ---s from an amount of 2250 pounds per square inch, and up.

With the rubber still in a soft state, the gas is now injected at a high pressure and at the same time a partial vulcanization is effected to retain the injected gas. As will be described in the following, this is carried out in two steps, a partial expansion and vulcanization, followed by a complete expansion and vulcanization. This is accomplished as follows:

The pressure is increased when heat is applied by the admission of steam through a steam jacket surrounding the gassing chamber for the purpose of partially vulcanizing the soft rubber containing the injected gas. This steam jacket, which is a spiral perforated tube, encircles the inner cylinder or gassing chamber to insure uniform distribution of heat. The steam pressure applied in the heating jackets may vary from four to sixteen pounds, and the heat is applied for a period of from two hunderd to six hundred minutes, depending on the physical conditions of the rubber product desired, such as the thickness of the material, weight, etc. Only partial vulcanization of the rubber has been accomplished up to this point.

The apparatus is now cooled either by permitting it to normally cool down, or by artificial means to cause more rapid cooling, the latter being preferred to save time.

At this point the gas chamber contains a considerable excess of the gas admitted for inflating the rubber, and this excess is drawn off slowly and stored in ether vats through a chalk separator for subsequent use. When the gas has all been withdrawn, the container with the rubber is removed from the gassing chamber.

At this time, as stated above, the rubber has been only partially vulcanized and has not yet been fully expanded to its maximum possibilities. Complete vulcanization and final expansion of this rubber material must be accomplished within twenty-four hours, in order to prevent loss of gas in the partly vulcanized rubber.

For the final vulcanization of the rubber, it is placed in a mold whose inner dimensions and shape are exactly the same as the external dimensions and shape of the desired article. In the present instance, this mold may consist of the assembled barrel staves of wood and metal. This is then subjected to a further high temperature of heat, preferably steam, at from sixty to one hundred twenty pounds pressure, the time of application varying, in accordance with the size of the molded material, anywhere from twenty-five minutes to twenty-three hours.

The end product of this process is a rubber which is spongy and inflated with a gas at high pressure and temperature until it expands and assumes a minute cellular structure, the cells of which are filled with the injected gas and a suitable preservative. A sealing composition has been added which imprisons the occluded gases in the pores or cells or interstices after the pressure and heat have been removed.

The resulting product we have found has considerable strength and durability and yet is extremely light, its weight varying from two and one half to five pounds per cubic foot, depending upon the pressure and temperature treatment given as cited above and upon the cellular seal provided in a manner which is now well known in the art.

In the final vulcanization process, the rubber is expanded until it adheres to the walls of the channel members, completely filling the space, further securing the metallic and veneer channel members and providing a complete seal.

The metal member providing the mechanical strength, the wood veneer may be extremely thin. Accordingly, very little liquid is required to swell it to produce the desired seals between staves.

Although the invention has been described in connection with beer barrels, it will be obvious that it can be used for other types of barrels. Accordingly we have, for example, discovered that this construction lends itself to cans such as are used to contain milk in transportation, and may, in fact, be applied to tanks of a size in which combined strength and insulation properties are desired.

Therefore we do not wish to be limited except as set forth in the appended claims.

We claim:

1. A container comprising insulating staves, each stave comprising a hard and rigid rubber composition of sealed minute cellular structure and a wood member connected to said rubber composition, said wood member facing the interior of the container and being positioned to abut similar wood members of adjacent staves upon being subjected to a swelling influence.

2. A container comprising an insulating stave, said stave comprising a hard and rigid insulating material of minute cellular structure; a wood veneer encasing said insulating material, said wood veneer being positioned to swell into engagement with adjacent staves, and a metallic re-enforcing member for providing mechanical strength for the stave.

3. A container comprising an insulating stave, said stave comprising an insulation member, a wood veneer encasing said insulation member, said wood veneer being positioned to abut the wood veneer on adjacent staves upon being subjected to a swelling influence to produce a seal against loss of liquid contained in the container, and a metallic member for providing mechanical strength for the stave, said metallic member being encased by said wood veneer and forming therewith a space to contain the insulation member.

4. A container comprising insulating wall elements, said wall element comprising a hard and rigid rubber composition of gas expanded sealed minute cellular structure and a wood member united to said gas expanded sealed minute cellular structure, said wood member facing the interior of said container and positioned to abut similar wood members of adjacent wall elements upon being subjected to a swelling influence.

5. An insulating container comprising wall elements, said wall elements comprising wooden members and a gas expanded sealed minute cellular rubber structure of relatively low sulphur content united thereto, said wooden members facing the interior of said container and positioned to abut similar wooden members of adjacent wall elements upon being subjected to a swelling influence.

6. An insulating container comprising wall elements, said wall elements comprising wooden members and a gas expanded sealed minute cellular rubber structure having a weight of the order of two and one-half to five pounds per cubic foot united thereto, said wooden members facing the interior of said container and positioned to abut similar wooden members of adjacent wall elements upon being subjected to a swelling influence.

DUDLEY ROBERTS.
FREDERICK WILLIAM PEEL.